(12) United States Patent
Gallardo

(10) Patent No.: US 12,078,293 B2
(45) Date of Patent: Sep. 3, 2024

(54) TANK COMPRISING INNER AND OUTER CHAMBERS AND AT LEAST ONE LINK SYSTEM WITH FLEXIBLE RADIAL BLADES LINKING SAID CHAMBERS

(71) Applicant: Airbus Operations SAS, Toulouse (FR)

(72) Inventor: Julien Gallardo, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 17 days.

(21) Appl. No.: 18/172,079

(22) Filed: Feb. 21, 2023

(65) Prior Publication Data

US 2023/0272879 A1    Aug. 31, 2023

(30) Foreign Application Priority Data

Feb. 25, 2022    (FR) ...................................... 2201665

(51) Int. Cl.
*F17C 1/12*    (2006.01)
(52) U.S. Cl.
CPC ........ *F17C 1/12* (2013.01); *F17C 2201/0109* (2013.01); *F17C 2203/03* (2013.01); *F17C 2203/0629* (2013.01); *F17C 2221/012* (2013.01); *F17C 2223/0161* (2013.01); *F17C 2260/04* (2013.01)
(58) Field of Classification Search
CPC .......................... F17C 1/12; F17C 2201/0109; F17C 2203/03; F17C 2203/0629; F17C 2221/012; F17C 2223/0161; F17C 2260/04
USPC .............. 220/560.1, 560.04, 560.05, 560.06, 220/560.12, 560.14
See application file for complete search history.

(56) References Cited

U.S. PATENT DOCUMENTS

| | | | |
|---|---|---|---|
| 3,241,705 A | | 3/1966 | Love et al. |
| 3,425,585 A | * | 2/1969 | Latham ................. F17C 13/083 220/560.12 |
| 3,446,388 A | | 5/1969 | Greenberg |
| 3,696,959 A | * | 10/1972 | Eifel ..................... F17C 13/086 220/901 |
| 3,764,036 A | * | 10/1973 | Dale ..................... F17C 13/086 280/830 |
| 6,015,106 A | * | 1/2000 | Turgeon .............. H01M 16/006 241/69 |

(Continued)

FOREIGN PATENT DOCUMENTS

| CA | 2441775 A1 | 11/2003 |
|---|---|---|
| WO | 2014015969 A1 | 1/2014 |

(Continued)

OTHER PUBLICATIONS

French Search Report dated Sep. 14, 2022; priority document.

*Primary Examiner* — Rafael A Ortiz
(74) *Attorney, Agent, or Firm* — Greer, Burns & Crain, Ltd.

(57) ABSTRACT

A double-walled tank including at least one link system linking the outer and inner chambers of the tank and including a central part linked to the inner chamber and at least three blades distributed around the central part, each blade extending between a first end linked to the central part and a second end which has a head linked to the outer chamber, each blade being sufficiently flexible to be deformed elastically between its first and second ends in a direction of displacement.

10 Claims, 11 Drawing Sheets

(56) References Cited

U.S. PATENT DOCUMENTS

| | | | |
|---|---|---|---|
| 8,910,487 B2 * | 12/2014 | Hylands | ............... F17C 13/084 62/50.7 |
| 2006/0236789 A1 | 10/2006 | Harper | |
| 2019/0145580 A1 | 5/2019 | Posselt et al. | |
| 2019/0178444 A1 | 6/2019 | Rebernik | |

FOREIGN PATENT DOCUMENTS

| | | |
|---|---|---|
| WO | 2014161899 A1 | 10/2014 |
| WO | 2017190846 A1 | 11/2017 |

* cited by examiner

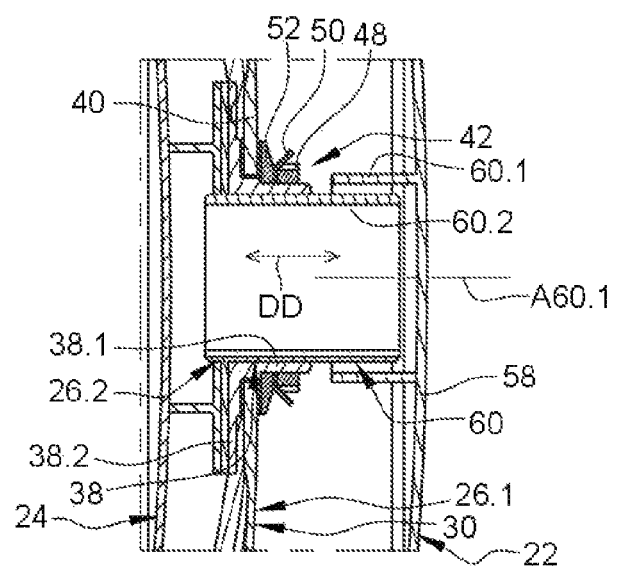

TANK COMPRISING INNER AND OUTER CHAMBERS AND AT LEAST ONE LINK SYSTEM WITH FLEXIBLE RADIAL BLADES LINKING SAID CHAMBERS

CROSS-REFERENCES TO RELATED APPLICATIONS

This application claims the benefit of the French patent application No. 2201665 filed on Feb. 25, 2022, the entire disclosures of which are incorporated herein by way of reference.

FIELD OF THE INVENTION

The present application relates to a tank comprising inner and outer chambers and at least one link system with flexible radial blades linking the chambers.

BACKGROUND OF THE INVENTION

According to an embodiment visible in FIG. 1, a hydrogen tank 10 comprises an outer chamber 12, an inner chamber 14 positioned in the outer chamber 12, a thermal insulation between the outer and inner chambers 12, 14 and two diametrically opposite link systems 16, 16', linking the outer and inner chambers 12, 14. In operation, because of the storage temperature of the hydrogen in the cryogenic state, the inner chamber 14 contracts much more than the outer chamber 12. Consequently, at least one of the two link systems 16 is configured to allow a displacement of the inner chamber 14 with respect to the outer chamber 12 in a direction of displacement. Generally, a first link system 16' (that on the left in FIG. 1) is rigid and allows no relative movement between the outer and inner chambers 12, 14 while a second link system 16 (that on the right in FIG. 1) allows a relative movement between the outer and inner chambers 12, 14.

This second link system 16 comprises a female sleeve 18.1 secured to the outer chamber 12 and a male sleeve 18.2 secured to the inner chamber 14, which is configured to slide in the female sleeve 18.1. The female and male sleeves 18.1, 18.2 are coaxial and have axes that coincide with the direction of displacement.

This embodiment is not fully satisfactory because of the risks of jamming caused by the frictions between the female and male sleeves 18.1, 18.2 and the random nature of the contacts between the female and male sleeves 18.1, 18.2.

SUMMARY OF THE INVENTION

The present invention aims to wholly or partly remedy the drawbacks of the prior art.

To this end, the subject of the invention is a tank comprising an outer chamber, an inner chamber positioned in the outer chamber and first and second link systems, diametrically opposite, linking the outer and inner chambers, the outer and inner chambers being displaced with respect to one another in a direction of displacement in operation.

At least one of the first and second link systems comprises a central part linked to one of the outer chamber and the inner chamber and at least three blades distributed around the central part, each blade extending between a first end linked to the central part and a second end which has a head linked to the other of the outer chamber and the inner chamber, each blade being sufficiently flexible to be deformed elastically between its first and second ends in the direction of displacement.

According to the invention, the blades are curved and have a profile such that the heads are:
offset towards the inner chamber with respect to the central part in the absence of strains, the absence of strains corresponding to the absence of hydrogen in the inner chamber, and
disposed substantially in a same transverse plane as the central part in the presence of strains, in operation, the presence of strains corresponding to the presence of hydrogen in the cryogenic state in the inner chamber.

The blades of the link system, by virtue of their capacity to be deformed elastically, allow the outer and inner chambers to be displaced with respect to one another in the direction of displacement (notably by the expansion effects) while ensuring the absorption of the radial forces between the outer and inner chambers. Furthermore, in the presence of hydrogen in the cryogenic state in the inner chamber, the latter moves away from the outer chamber in line with the link system because of the retraction of the inner chamber linked to the reduction of its temperature. The fact that the profile of the blades is curved and that the blades are positioned substantially in a transverse plane when the inner chamber has contracted because of the presence of hydrogen in the cryogenic state in the inner chamber, makes it possible to limit the strains in the blades, in the presence of hydrogen in the cryogenic state in the inner chamber, to a much lower level than if the blades did not have such a curved profile. Indeed, this curved profile thus allows the blades to be deformed without high strains when the inner chamber retracts. It also allows the blades to be deformed without high strains when the temperature of the blades decreases under the effect of thermal conduction from the inner chamber containing hydrogen in the cryogenic state.

According to another feature, the central part is linked to the inner chamber and each head is linked to the outer chamber.

According to another feature, the central part comprises a support secured to the inner chamber, a ring linked to the outer chamber via blades and configured to be positioned around the support and a fixing system configured to immobilize the ring with respect to the support at least in the direction of displacement, the link system comprising dissociable first and second parts, the first part comprising the ring, the blades and the heads, the second part comprising the support.

According to another feature, the support comprises a base fixed onto the inner chamber by the fixing elements and a tubular portion secured to the base, having an axis substantially coinciding with the direction of displacement and onto which the ring is fitted.

According to another feature, the fixing system comprises a threaded section provided on the tubular portion and a nut configured to be screwed onto the threaded section.

According to another feature, the fixing system comprises a system for blocking rotation of the nut and/or a compression fitting inserted between the nut and the ring and/or two shear rings positioned on either side of the ring.

According to another feature, the outer chamber comprises an aperture in line with the support and a cover for blocking the aperture.

According to another feature, the outer chamber comprises, for each head, an attachment with a U section, comprising a base against which the head is fixed, positioned in a substantially transverse plane and legs linking the base to the outer chamber.

According to another feature, the link system comprises a safety system comprising a female sleeve secured to the outer chamber which has an axis coinciding with the direction of displacement and a male extension secured to the inner chamber, positioned in the female sleeve, the male extension and the female sleeve being dimensioned such that there remains a play all around the male extension between the female sleeve and the male extension when the blades are not damaged.

BRIEF DESCRIPTION OF THE DRAWINGS

Other features and advantages will emerge from the following description of the invention, a description given purely by way of example, in light of the attached drawings in which:

FIG. 11 is a longitudinal cross-section of a part of a link system illustrating another embodiment of the invention.

DETAILED DESCRIPTION OF THE PREFERRED EMBODIMENTS

Figure 1:
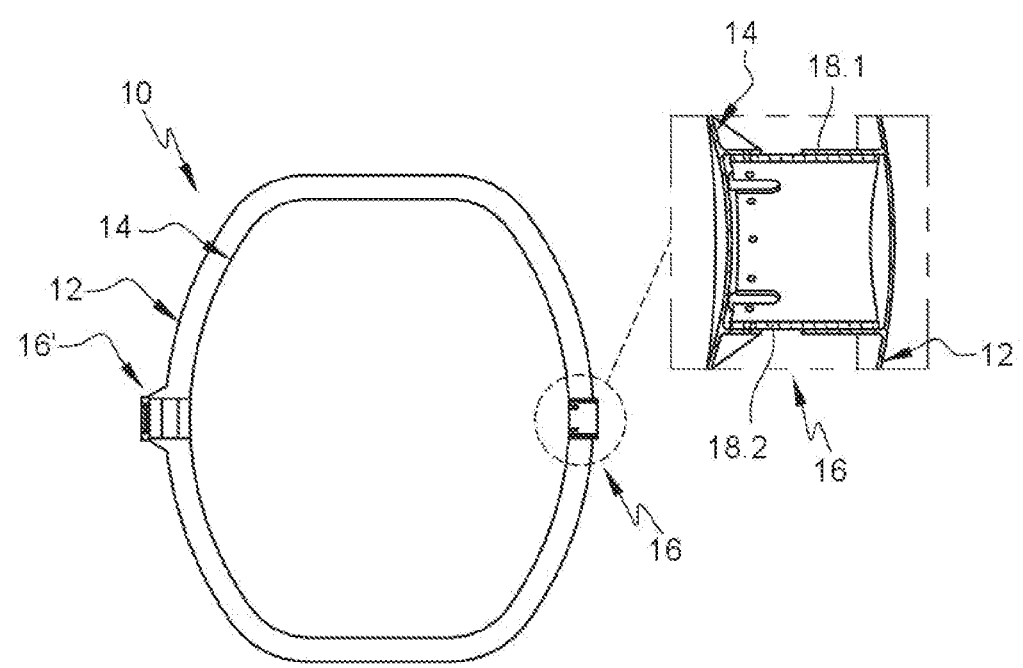
FIG. 1 is a schematic representation of a tank and of a link system illustrating an embodiment of the prior art.
Figure 2:
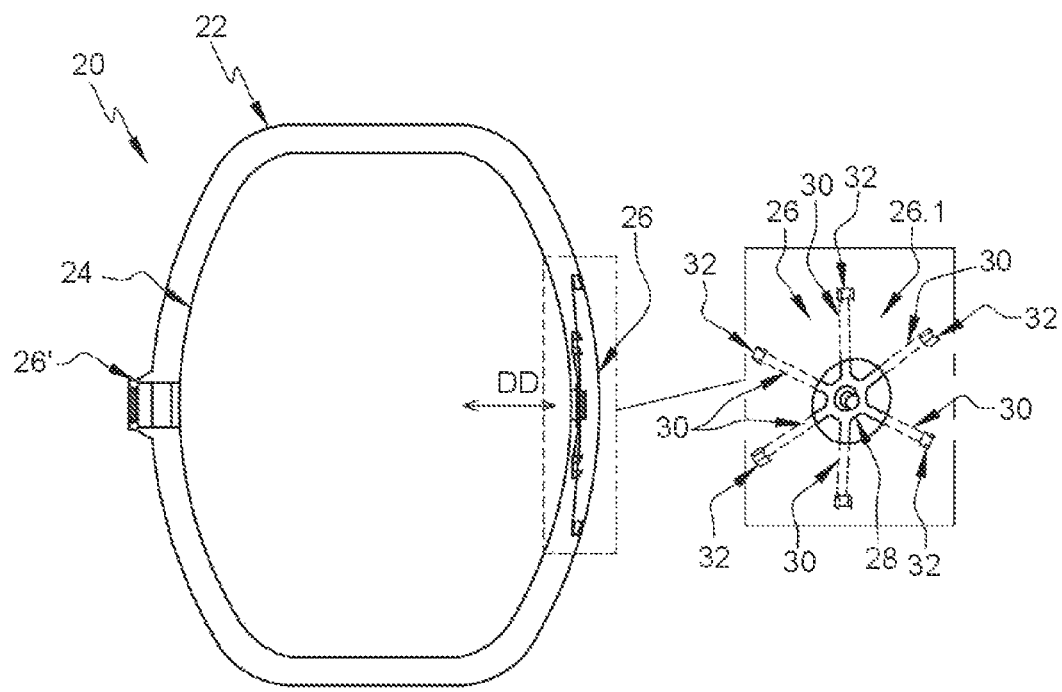
FIG. 2 is a schematic representation of a tank and of a link system illustrating an embodiment of the invention.

According to an embodiment visible in FIG. 2, a tank 20 comprises an outer chamber 22, an inner chamber 24 positioned in the outer chamber 22 and first and second link systems 26, 26', diametrically opposite, linking the outer and inner chambers 22, 24.

According to one application, the tank 20 is designed to store hydrogen in the cryogenic state in the inner chamber 24. According to this application, the tank 20 comprises a thermal insulation between the outer and inner chambers 22, 24.

The outer and inner chambers 22, 24 and the thermal insulation are not further described because they can be identical to those of the prior art.

According to a first configuration, the second link system 26' is rigid and identical to the rigid link system of the prior art. According to a second configuration, the first and second link systems 26, 26' are identical.

In operation, in line with the first link system 26, the outer and inner chambers 22, 24 can be displaced with respect to one another in a direction of displacement DD due to the different expansion effects of the outer and inner chambers 22, 24.

Hereinafter in the description, a longitudinal direction is parallel to the direction of displacement DD. A radial direction is at right angles to the direction of displacement DD. A transverse plane is a plane at right angles to the direction of displacement DD. A longitudinal plane contains the direction of displacement DD.

The link system 26 comprises a central part 28 linked to a first element which is one of the outer chamber 22 and the inner chamber 24, and several blades 30 which each extend between first and second ends, for each blade 30 the first end being linked to the central part 28, the second end having a head 32 linked to a second element, different from the first element, which is the other of the outer chamber 22 and the inner chamber 24.

Each blade 30 is radial. "Radial blade" is understood to mean that the blade 30 is oriented in an approximately radial direction, its first and second ends being positioned in a longitudinal plane. According to this arrangement, the head 32 is offset with respect to the central part 28 in a direction including a component at right angles to the direction of displacement DD.

Each blade 30 takes the form of a strip of material. It is sufficiently flexible to be deformed elastically between its first and second ends in the direction of displacement DD.

According to one arrangement, the central part 28 is linked to the inner chamber 24 and each head 32 is linked to the outer chamber 22.

Figure 3:
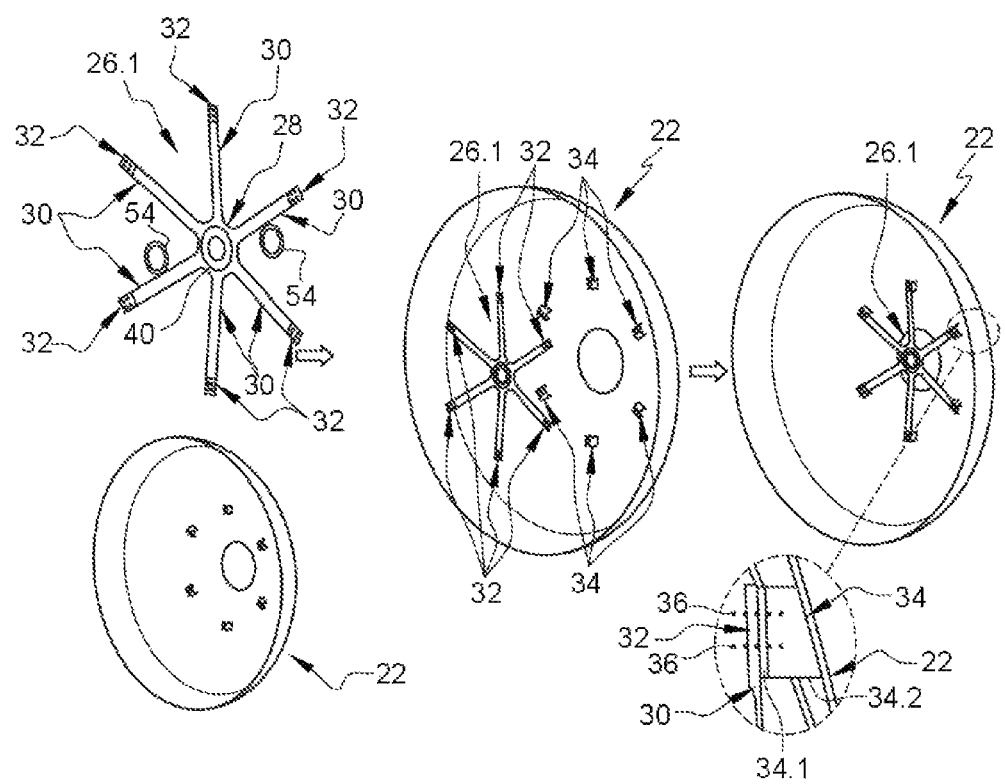
FIG. 3 is a perspective view of a part of an outer chamber and of a first part of a link system at different mounting steps illustrating an embodiment of the invention.

As illustrated in FIG. 3, for each head 32, the outer chamber 22 comprises an attachment 34 with a U section, comprising a base 34.1 against which a head 32 is fixed, positioned in a substantially transverse plane and legs 34.2 linking the base 34.1 to the outer chamber 22.

According to one configuration, each head 32 is linked to an attachment 34 by at least one fixing element 36 such as a screw, a bolt, a rivet or the like.

According to one embodiment, the central part 28 comprises a support 38 secured to the inner chamber 24, a ring 40 linked to the outer chamber 22 via the blades 30 and configured to be positioned around the support 38 and a fixing system 42 configured to immobilize the ring 40 with respect to the support 38 at least in the direction of displacement DD. Thus, the link system 26 comprises dissociable first and second parts 26.1, 26.2.

According to this embodiment, the first part 26.1, visible in FIG. 3, comprises the ring 40, the blades 30 and the heads 32 which form just one and the same piece. The second part 26.2, visible in FIG. 4, comprises the support 38.

According to one configuration, the support 38 comprises a base 38.1 fixed onto the inner chamber 24 by the fixing elements 44, such as bolts or rivets for example, and a tubular portion 38.2 secured to the base 38.1, having an axis A38 that substantially coincides with the direction of displacement DD and onto which the ring 40 is fitted. The base 38.1 and the tubular portion 38.2 form just one and the same piece.

The support 38 can comprise a back plate positioned in the inner chamber 24 and linked to the base 38.1 by the fixing elements 44.

The support 38 can be made of metal or of a composite material.

The ring 40 is substantially flat and positioned in operation in a transverse plane. It has an inner diameter substantially equal to or very slightly greater than the outer diameter of the tubular portion 38.2.

The first part 26.1, which includes the ring 40, the blades 30 and the heads 32, can be made of metal or of a composite material.

Figure 9A:
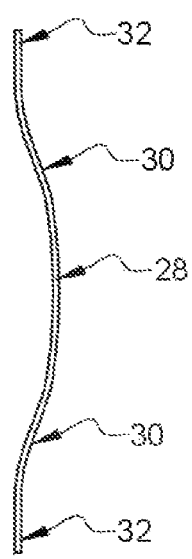
FIGS. 9A and 9B are schematic representations of two link systems having different profiles illustrating two embodiments of the invention.
Figure 9B:
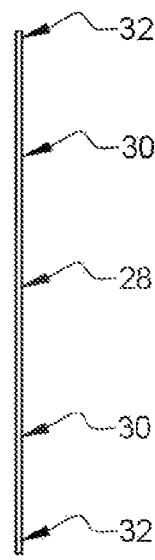

As illustrated in FIG. 9A, the first part 26.1 and more particularly the blades 30 are curved, with the heads 32 being offset towards the inner chamber 24 with respect to the central part 28 in the absence of strains and being disposed substantially in a same transverse plane as the central part 28 in the presence of strains in operation. Thus, when the two outer and inner chambers 22, 24 are at the same temperature, for example in the absence of hydrogen in the inner chamber 24, the blades 30 have a curved profile. In the presence of hydrogen in the inner chamber 24, the latter moves away from the outer chamber 22 in line with the link system 26. The curved profile of the blades 30 is determined such that the blades 30 are positioned in a transverse plane, as illustrated in FIG. 9B, when the inner chamber 24 has contracted due to the presence of hydrogen in the cryogenic state in said inner chamber 24.

Figures 10A, 10B, 10C:
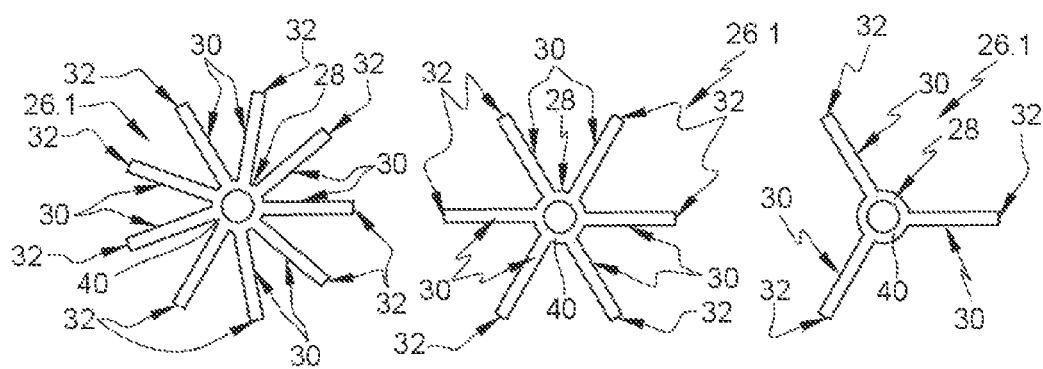
FIGS. 10A, 10B and 10C are schematic representations of three link systems illustrating three embodiments of the invention.

As illustrated in FIGS. 2, 3 and FIG. 10B, the link system 26 comprises six blades 30 evenly distributed over the periphery of the central part 28. Obviously, the invention is not limited to this number of blades 30. Thus, the link system 26 can comprise nine blades 30, as illustrated in FIG. 10A, or three blades 30, as illustrated in FIG. 10C. Whatever the embodiment, the link system 26 comprises at least three blades 30 evenly distributed around the central part 28.

Figure 7:
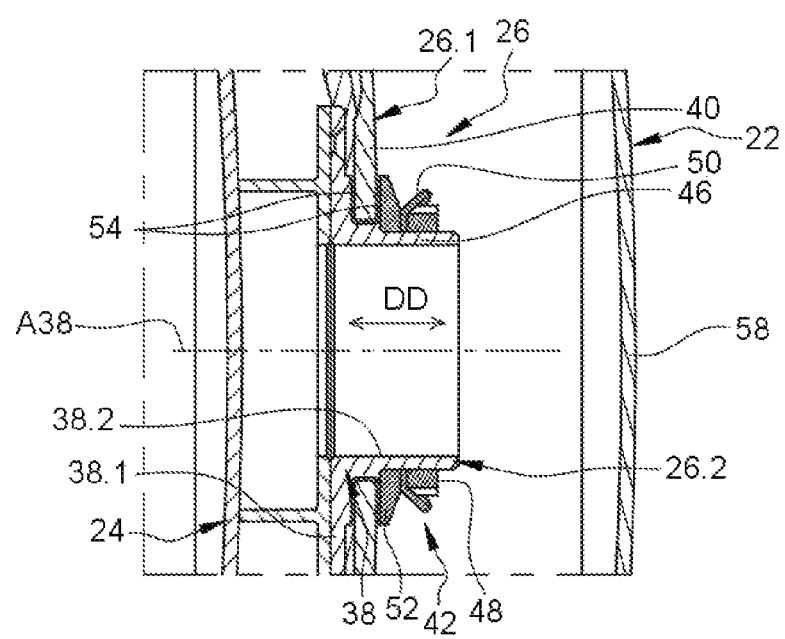
FIG. 7 is a longitudinal cross-section of the first and second parts of the link system, visible in FIGS. 3 and 4, assembled, illustrating an embodiment of the invention.
Figure 8:
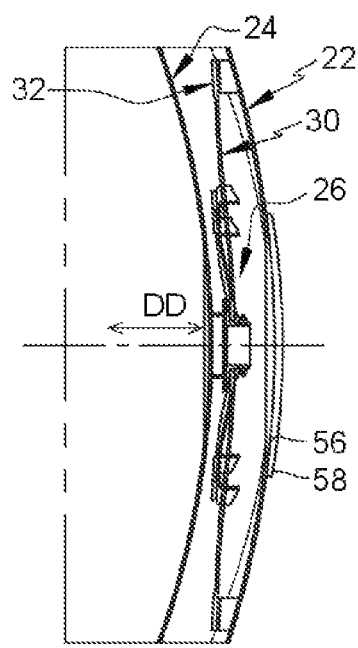
FIG. 8 is a longitudinal cross-section of a part of a tank illustrating an embodiment of the invention.

According to an embodiment visible in FIG. 7, the fixing system 42 comprises a threaded section 46 provided on the outer cylindrical surface of the tubular portion 38.2 and a nut 48 configured to be screwed onto the threaded section 46. In addition, the fixing system 42 comprises a system 50 for blocking rotation of the nut 48 cooperating with the latter to immobilize it in rotation and/or a compression fitting 52 inserted between the nut 48 and the ring 40.

According to an embodiment visible in FIGS. 3 and 7, the fixing system 42 comprises two shear rings 54 positioned on either side of the ring 40, one of them being inserted between the base 38.1 of the support 38 and the ring 40, the other being inserted between the compression fitting 52 and the ring 40.

To allow the placement of the fixing system 42, the outer chamber 22 comprises an aperture 56 in line with the support 38 and a cover 58 for blocking the aperture 56. The aperture 56 is dimensioned to allow the placement of the fixing system 42 from the outside of the outer chamber 22.

A method for mounting the tank 20 is illustrated in FIGS. 3 to 8.

Figure 4:
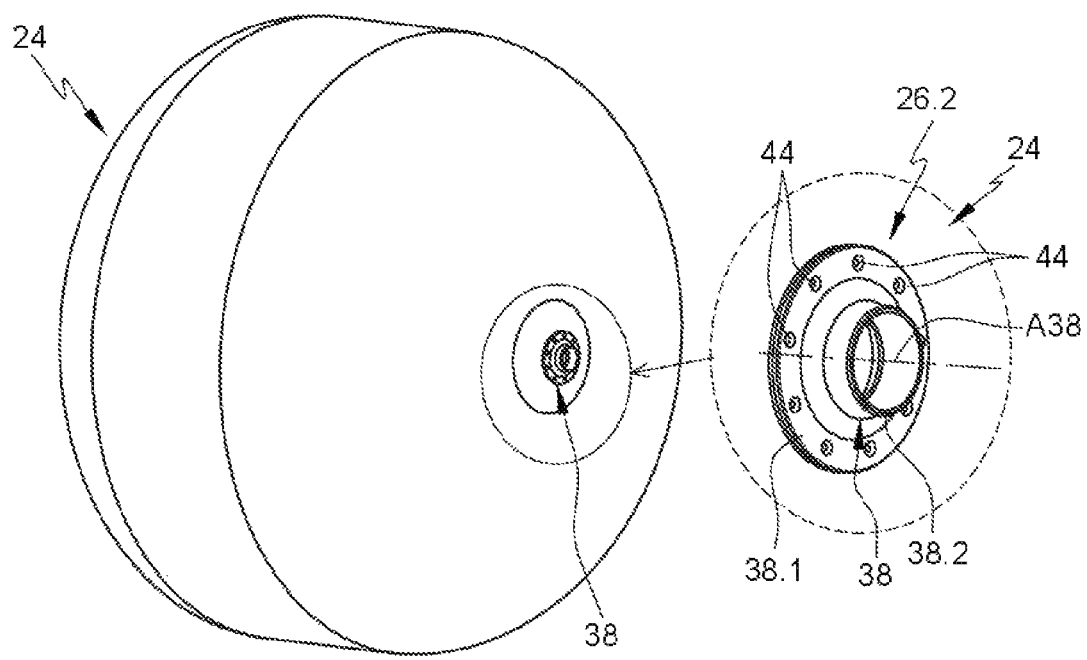
FIG. 4 is a perspective view of a part of an inner chamber and of a second part of a link system illustrating an embodiment of the invention.

After having produced the outer and inner chambers 22, 24, the first part 26.1 is put in place by linking each of the heads 32 to the corresponding attachment 34 using the fixing elements 36, as illustrated in FIG. 3. In parallel, the base 38.1 of the support 38 is fixed onto the inner chamber 24 using the fixing elements 44, as illustrated in FIG. 4.

Figure 5:
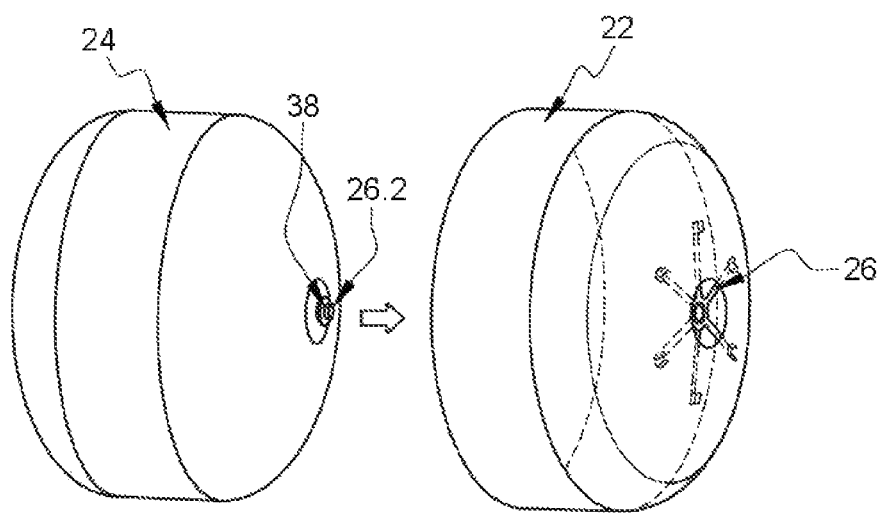
FIG. 5 is a perspective view of the inner and outer chambers visible in FIGS. 3 and 4 prior to their assembly illustrating an embodiment of the invention.
Figure 6:
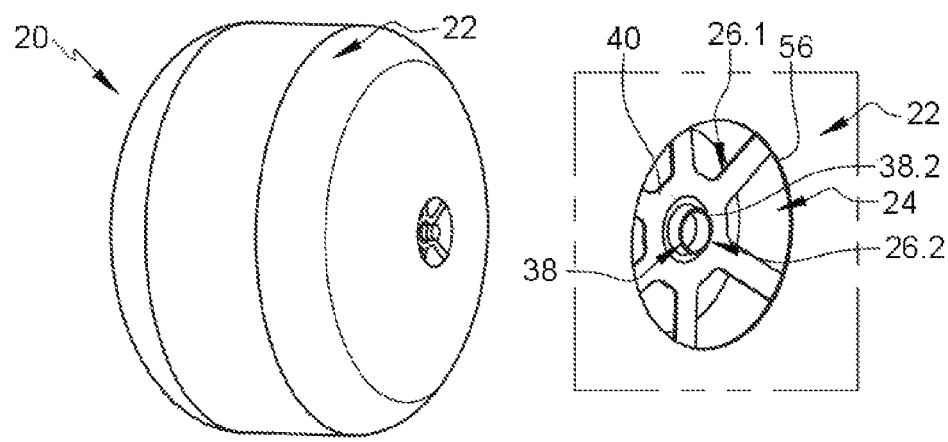
FIG. 6 is a perspective view of a part of a tank after the insertion of the inner chamber into the outer chamber illustrating an embodiment of the invention.

Next, the inner chamber 24 is positioned in the outer chamber 22 by positioning the ring 40 of the first part 26.1 around the tubular portion 38.2 of the support 38, as illustrated in FIGS. 5 and 6. To be able to put the inner chamber 24 in place in the outer chamber 22, the latter is produced in two parts which are assembled after the inner chamber 24 has been put in place.

The components of the fixing system 42 are introduced via the aperture 56 and put in place to immobilize the ring 40 with respect to the support 38 in the direction of displacement DD.

Finally, the aperture 56 is closed by fixing the cover 58 onto the outer chamber 22 all around the aperture 56 by any appropriate means, such as welding, for example.

The blades 30 of the link system 26 allow the outer and inner chambers 22, 24 to be displaced with respect to one another in the direction of displacement DD due to the expansion effects. In addition, the blades 30 ensure the absorption of the radial forces (oriented at right angles to the direction of displacement DD) between the outer and inner chambers 22, 24.

According to an embodiment visible in FIG. 11, the link system 26 comprises a safety system 60 allowing the outer chamber 22 to support the inner chamber 24 in the event of breakage of the blades 30. This link system 26 comprises a female sleeve 60.1 secured to the outer chamber 22, more particularly its cover 58, having an axis A60.1 that coincides with the direction of displacement DD, and a male extension 60.2, secured to the inner chamber 24, configured to be positioned in the female sleeve 60.1. The female sleeve 60.1 and the male extension 60.2 are dimensioned such that, in the absence of contraction of the inner chamber 24, the male extension 60.2 does not interfere with the cover 58 and that, in the presence of a contraction of the inner chamber 24, a part of the male extension 60.2 is always positioned in the female sleeve 60.1. The female sleeve 60.1 and the male extension 60.2 are also dimensioned such that there remains a play all around the male extension 60.2 between the latter and the female sleeve 60.1, when the blades 30 are not damaged, so that the safety system 60 does not induce any friction between the female sleeve 60.1 and the male extension 60.2.

According to one configuration, the male extension 60.2 can be an extension of the support 38, more particularly of its tubular portion 38.2. According to another configuration, the male extension 60.2 is a tube distinct from the support 38 fitted into the tubular portion 38.2 of the support 38.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:
   an outer chamber,
   an inner chamber positioned in the outer chamber; and
   first and second link systems, diametrically opposite, linking the outer chamber and the inner chamber, the outer chamber and the inner chamber being displaced with respect to one another in a direction of displacement in operation,
   wherein at least one of the first and second link systems comprises:

a central part linked to one of the outer chamber and the inner chamber; and at least three blades distributed around the central part, each blade extending between a first end linked to the central part and a second end which has a head linked to the other of the outer chamber and the inner chamber;

wherein each blade is sufficiently flexible to be deformed elastically between its first and second ends in the direction of displacement, wherein the at least three blades are curved and have a profile such that the heads are:

offset towards the inner chamber with respect to the central part in an absence of strains corresponding to an absence of hydrogen in the inner chamber, and disposed substantially in a same transverse plane as the central part in a presence of strains corresponding to a presence of hydrogen in a cryogenic state in the inner chamber.

2. The tank according to claim 1,
wherein the central part is linked to the inner chamber, and
wherein each of the heads is linked to the outer chamber.

3. The tank according to claim 2,
wherein the central part comprises:
a support secured to the inner chamber,
a ring linked to the outer chamber via the blades and configured to be positioned around the support; and
a fixing system configured to immobilize the ring with respect to the support at least in the direction of displacement.

4. The tank according to claim 3,
wherein the support comprises:
a base fixed onto the inner chamber by fixing elements; and
a tubular portion secured to the base, having an axis substantially coinciding with the direction of displacement and onto which the ring is fitted.

5. The tank according to claim 4,
wherein the fixing system comprises:
a threaded section provided on the tubular portion, and
a nut configured to be screwed onto the threaded section.

6. The tank according to claim 5, wherein the fixing system comprises:
a system for blocking rotation of the nut;
a compression fitting inserted between the nut and the ring;
two shear rings positioned on either side of the ring; or
any combination of the above.

7. The tank according to claim 3,
wherein the outer chamber comprises:
an aperture in line with the support; and
a cover configured to block the aperture.

8. The tank according to claim 2,
wherein the outer chamber comprises, for each of the heads, an attachment with a U section, comprising:
a base against which the head is fixed, positioned in a substantially transverse plane; and
legs linking the base to the outer chamber.

9. The tank according to claim 1, wherein the link system further comprises:
a safety system comprising:
a female sleeve secured to the outer chamber, which has an axis coinciding with the direction of displacement; and
a male extension, secured to the inner chamber, positioned in the female sleeve, the male extension and the female sleeve being dimensioned such that there remains a play all around the male extension between the female sleeve and the male extension when the blades are not damaged.

10. The tank according to claim 3, wherein the first and second link systems comprise dissociable first and second parts, the first part comprising the ring, the blades and the heads, the second part comprising the support.

* * * * *